(12) United States Patent
Esper

(10) Patent No.: US 6,508,337 B1
(45) Date of Patent: Jan. 21, 2003

(54) PROGRESSIVELY ENGAGING CLUTCH

(75) Inventor: Leo Joseph Esper, Howell, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,952

(22) Filed: Mar. 6, 2002

(51) Int. Cl.[7] ................................................ F16D 55/36

(52) U.S. Cl. .................................... 188/71.5; 192/109 A

(58) Field of Search .................... 188/71.5; 192/85 R, 192/85 A, 85 AA, 85 AB, 103 F, 107 R, 107 C, 109 A, 109 F

(56) References Cited

U.S. PATENT DOCUMENTS 3,285,379 A * 11/1966 Helquist ................. 192/109 A
5,960,923 A * 10/1999 Araki ..................... 192/109 A

* cited by examiner

*Primary Examiner*—Jack Lavinder
*Assistant Examiner*—C. T. Bartz
(74) *Attorney, Agent, or Firm*—F. G. McKenzie

(57) ABSTRACT

A clutch assembly having multiple separator plates and friction plates. The separator plates include springs for causing sequential engagement of the friction plates and/or a gradual engagement of friction plates by tipping one of the separator plates during the initial clutch engagement. This allows for a controlled gradual engagement of the clutch in a relatively short time.

19 Claims, 13 Drawing Sheets

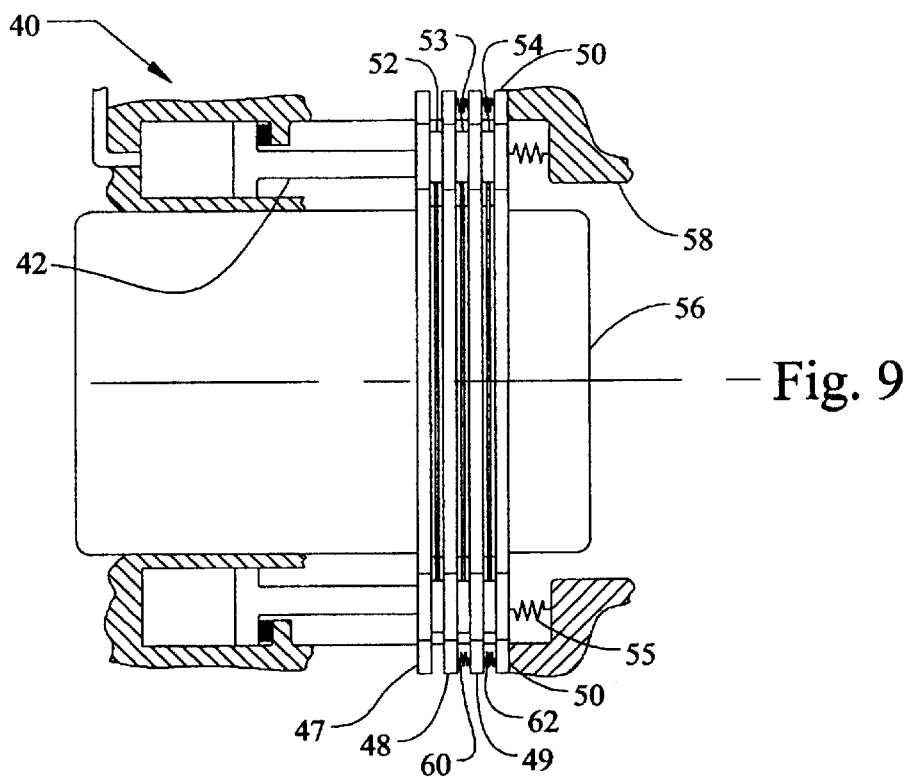
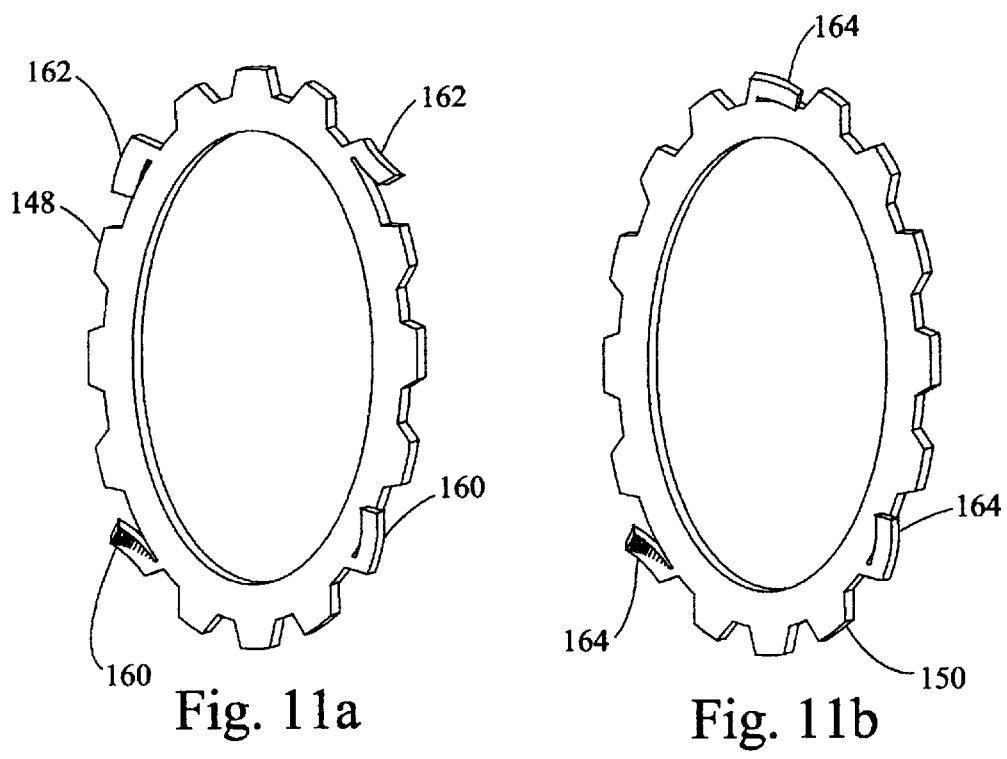

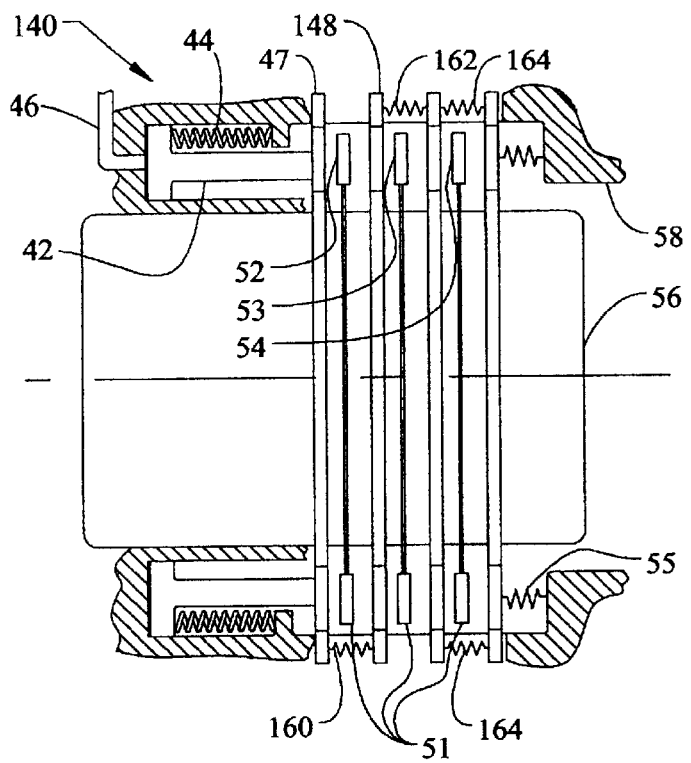
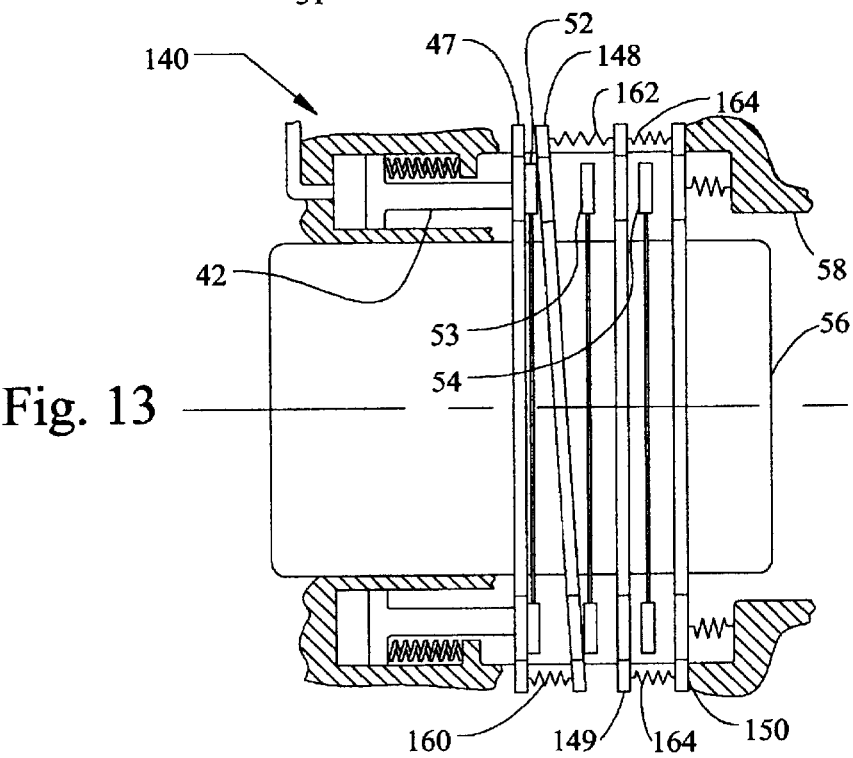

PROGRESSIVELY ENGAGING CLUTCH

BACKGROUND OF INVENTION

The present invention relates to clutches, and more particularly to clutches employed in vehicle drivelines.

Conventionally, vehicles employ clutches in the drive train to allow for shifting between gears and transferring torque. For example, in some automatic transmissions, when the gear shift lever is initially moved into the reverse position, a clutch within the transmission begins to engage. This particular clutch is employed to decelerate several internal transmission components to rest, which then cause the reversal of direction of rotation of other transmission components. The components may be decelerated from, for example, 250 RPM down to zero. The changes in momentum of these components undergoing these changes in speed create reaction forces, which are propagated through the drive-train, producing a harsh engagement. This harsh engagement is sometimes objectionable to vehicle occupants. The harsh engagement can most commonly occur in transmission shifts from park to reverse, reverse to drive, and drive to reverse.

A common type of clutch that is employed to decelerate the automatic transmission components is a multi-plate friction clutch. These clutches are filled with a fluid that helps to dissipate the heat and in the operation of the clutch. FIGS. 1–3 illustrate a prior art embodiment of a multi-plate friction clutch. This clutch assembly 18 includes a piston 20, a return spring 22, and a hydraulic feed port 24 employed for engaging and disengaging the clutch 18. The clutch assembly 18 also includes three separator plates 26 and a pressure plate 28, interleaved with three friction plates 30. There is also a wave spring 32 mounted behind the pressure plate 28. All of the plates and wave spring are mounted concentrically about the central axis of the clutch. Also mounted about the central axis of the clutch 18, and in engagement with the friction plates 30, is a rotating component 34, which may be a shaft connected to a gear set or other typical rotating components connected to a clutch. A stationary component or housing 36 is engaged with the separator plates 26 and pressure plate 28. When referring to a stationary or non-rotating component that the clutch engages in a transmission, this may also mean a component that does rotate, but at a different velocity than the rotating component engagement of the clutch, then, will force the two components to rotate at the same velocity, rather than bring the rotational component to a stop.

FIG. 2 illustrates the prior art clutch assembly 18 in the open (disengaged) position. One will note that there is a gap between the various plates 26, 28 and 30, so the rotating component 34 can generally rotated freely, relative to the fixed component 36, except for some drag due to the viscosity of the fluid. The clutch assembly's braking capacity is controlled by a hydraulic circuit, not shown, that provides an increasing pressure to the piston 20. As the clutch is actuated, the piston 20 applies an increasing force to squeeze the rotating friction plates 30 up against the non-rotating separator plates 26. As the squeezing force increases, the braking torque increases, and the rotating component 34 decelerates more quickly. The squeezing pressure rises to a predetermined maximum level, which defines the final braking and holding capacity of the clutch assembly 18. In order to better control the rise in pressure, some employ an accumulator and an orifice (not shown) to better control the pressure rise rate, as well as, a wave spring 38 to soften the transients effects that occur near the complete clutch engagement.

For a clutch such as that shown in FIGS. 1–3 to be applied to the transmission discussed above, the time to decelerate the components to rest, and the rate at which the clutch gains braking capacity is critical to obtaining the proper operating characteristics. If the component deceleration is too quick, the engagement will feel harsh to the vehicle operator, and if done too slowly, the vehicle operator could begin to accelerate before the clutch is fully engaged, again causing a harsh feel. Neither the accumulator/orifice, nor the wave spring adequately account for both of these concerns. This is true because, for typical multi-plate friction clutches, all friction elements gain capacity simultaneously. For this clutch, then, in order to prevent objectionable torque disturbances during clutch engagement, there must be a slow fluid pressure rise rate. But this conventional clutch is too slow for many applications.

Furthermore, since these clutches are filled with oil, even if one slows the compression of the plates, they can still begin transferring torque at too great of a rate. This is because as the clutch is starting to close up, the plates are pressed close to one another, and viscous friction drag begins transferring the torque between plates even though there is not contact yet. So in this conventional clutch, it produces much more clutch capacity early in the piston closing stroke because of this viscous drag. Thus, in order to achieve an adequate overall clutch engagement, one must adequately control both the asperity torque (friction braking effect) and the hydrodynamic torque (viscous drag braking), which add together to cause the overall clutch torque (clutch braking).

Some have tried to make clutch engagement more gradual by employing waved friction plates. Some have tried by employing waved or Belleville washer cushion springs at the friction element interface in the clutch. Others have tried restrained separator plates, which provide friction plates with their own clearance, to reduce viscous drag. But all of these have proven to be inadequate to cause a progressive transfer of torque, but in a relatively short time, and be reliable and cost effective. Some have tried to prevent objectionable torque disturbances due to too quick of a clutch engagement by employing waved or Belleville springs at the clutch stack, or varying the orifices, or through adaptive fluid controls. However, each of these techniques also has its drawbacks.

Thus, it is desirable to have a relatively fast applying multi-plate friction clutch system, that minimizes torque disturbance transmitted to the vehicle drivetrain as the clutch engages. Further, there are other general applications of multi-plate friction clutches, where a soft engagement is desired, other than in automatic transmissions. In such other applications where a relatively quick, soft engagement is desired, the prior art clutches also may be inadequate to perform as needed.

SUMMARY OF INVENTION

In its embodiments, the present invention contemplates a clutch assembly for controlling the rotation between a rotating member and a non-rotating member. The clutch assembly includes a first set of frictional members, including at least two first frictional members; and a second set of frictional members, including at least three second frictional members interleaved with the first set of frictional members. One of the first set and the second set is rotationally fixed to the rotating member, and the other of the first and the second set is rotationally fixed to the non-rotating member. The clutch assembly also includes a compressor, having a series of positions ranging from an open position allowing for gaps between adjacent members of the first set and the second set of frictional members to a closed position that does not allow for gaps between adjacent members of the first set and the second set of frictional members. The second set of frictional members has at least one spring located at a periphery of at least one of the second frictional members, with the spring extending toward at least one of the other of the second frictional members for biasing the at least one of the second frictional members away from the other of the second frictional members.

The present invention further contemplates a method for controlling the rotation between a rotating member and a non-rotating member in a clutch assembly, the clutch assembly having a first set of frictional members rotationally coupled to the rotating member and a second set of frictional members interleaved with the first set and rotationally coupled to the non-rotating member, the method comprising the steps of: applying an initial pressure to squeeze the first set of frictional members and second set of frictional members toward each other; spring biasing at least one member of the second set of frictional members away from an adjacent one of the members of the second set of frictional members; applying a second range of pressure greater than the initial pressure to squeeze the first set of frictional members into contact with the second set of frictional members, for the members that are not spring biased away from one another; and applying a third range of pressure greater than the second range of pressure to squeeze the members in the second set of members that are spring biased away from one another into contact with the first set of frictional members mounted therebetween.

Accordingly, an object of the present invention is to provide a multi-plate clutch assembly which, during engagement, allows for tilting of the separator plates in order to progressively engage portions of the plate contact surfaces.

Another object of the present invention is to provide a multi-plate clutch which, during engagement, retards the application of some of the plates at the onset of clutch engagement in order to obtain sequential engagement of the plates.

An advantage of the present invention is that the clutch will have an improved engagement feel by minimizing the hydrodynamic torque gain and permitting a more gradual asperity torque gain within a clutch.

Another advantage of the present invention is that it provides a multi-plate friction clutch system that minimizes the affects of full face viscous drag, and also promotes each friction element to begin gaining capacity at staggered times from the other friction elements during the engagement process, in order to provide gentle, yet relatively quick, application of the clutch.

An added advantage of the present invention is that by employing springs between the separator plates, the separator plates and friction plates are held spaced apart better during open clutch operation, thereby potentially reducing the open clutch drag.

BRIEF DESCRIPTION OF DRAWINGS

FIG. 9 is a schematic view of the clutch of FIG. 6, illustrated in a closed position;

FIG. 11a is a perspective view, on an enlarged scale, of a separator plate in accordance with a second embodiment of the present invention;

FIG. 11b is a perspective view, on an enlarged scale, of a pressure plate in accordance with a second embodiment of the present invention;

FIG. 12 is a schematic view of the clutch of FIG. 10, illustrated in the open position;

FIG. 13 is a schematic view of the clutch of FIG. 12, illustrated in the mostly open position;

DETAILED DESCRIPTION

Figure 1:
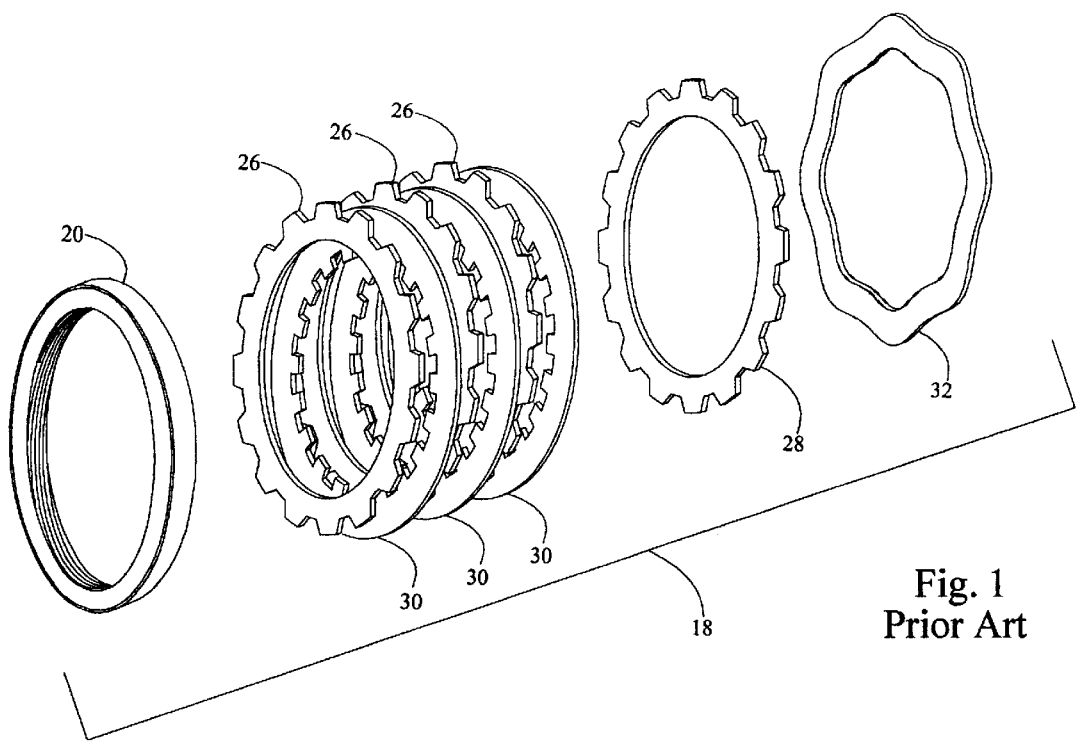
FIG. 1 is an exploded, perspective view of a portion of a prior art, multi-plate friction clutch.
Figure 2:
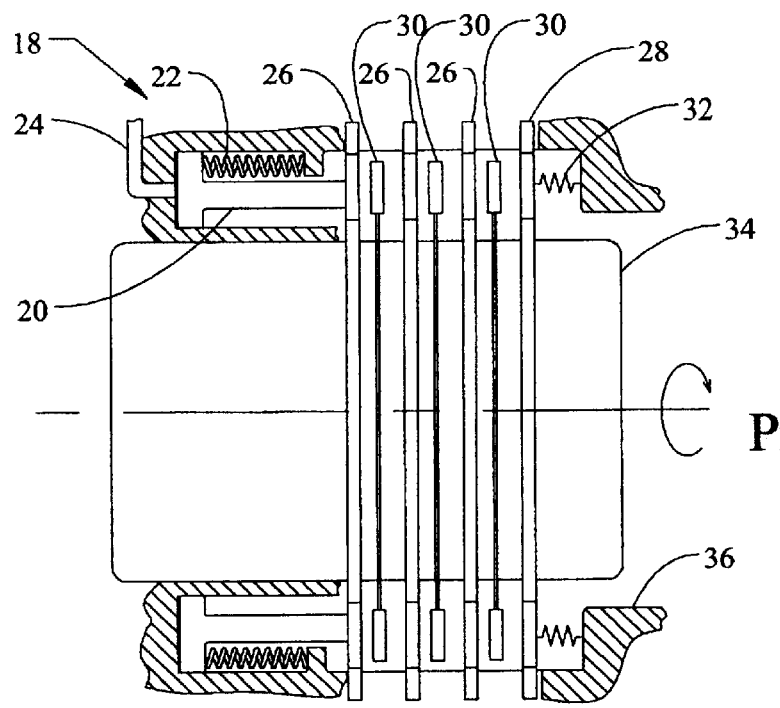
FIG. 2 is a schematic view of the prior art clutch of FIG. 1 show in an open (disengaged) position.
Figure 3:
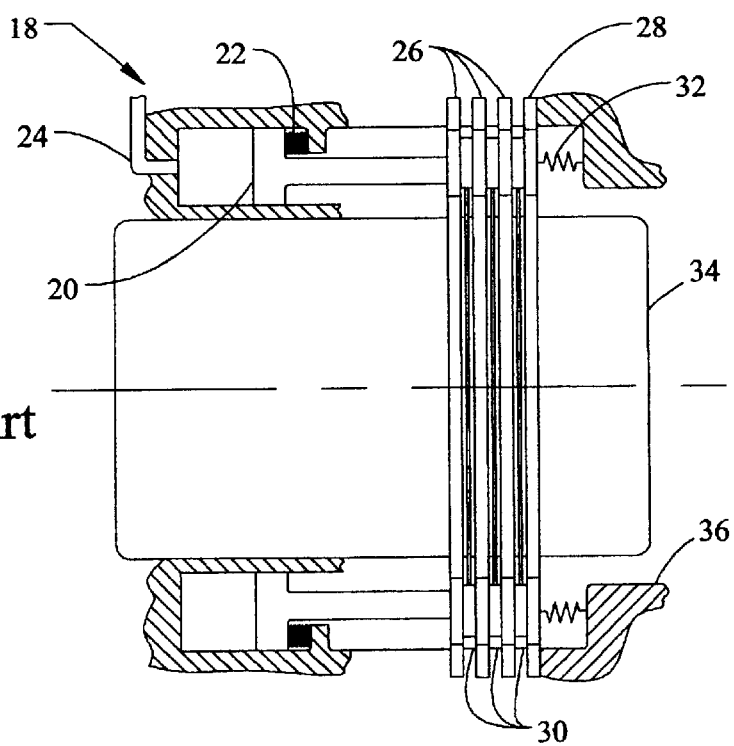
FIG. 3 is a is a schematic view similar to FIG. 2, but shown in a closed (engaged) position.
Figure 4:
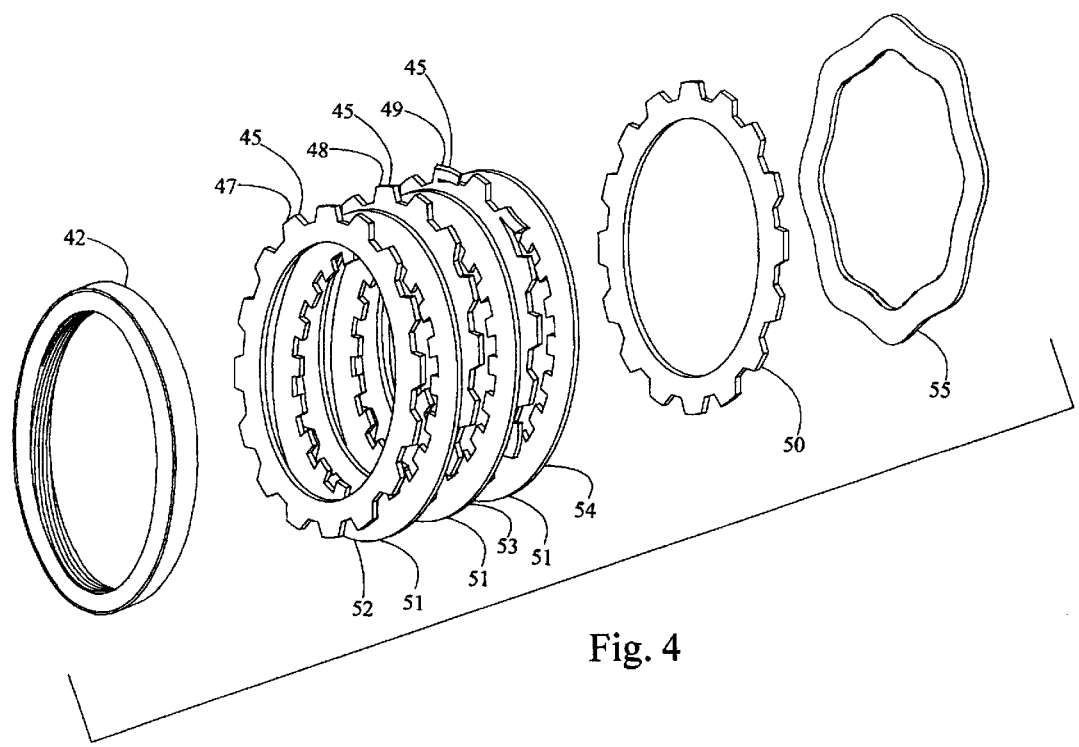
FIG. 4 is an exploded, perspective view of a portion of a multi-plate friction clutch in accordance with an embodiment of the present invention.
Figure 5:
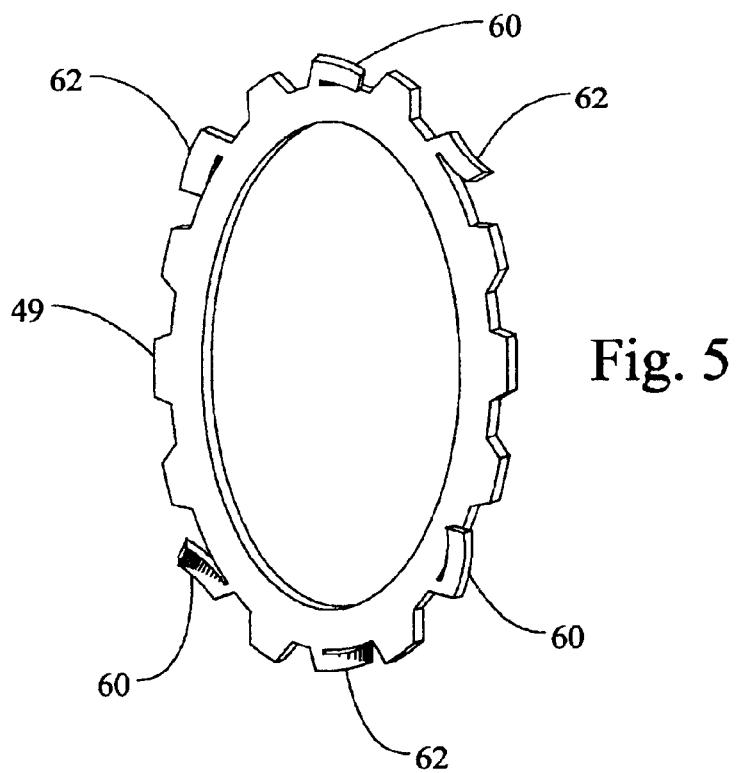
FIG. 5 is a perspective view, on an enlarged scale, of a separator plate in accordance with an embodiment of the present invention.

A first embodiment of the present invention is shown in FIGS. 4–9. A clutch assembly 40 includes a piston 42, a return spring 44, and a hydraulic feed port 46 employed for engaging and disengaging the clutch 40. The pressure in the hydraulic feed port 46 is controlled by a conventional hydraulic circuit and controller (not shown). The clutch assembly 40 also includes a group of separator plates 45, in this example a first 47, a second 48 and a third 49 separator plate, and a pressure plate 50. These plates 45, 50 are interleaved with a group of friction plates 51, in this example a first 52, a second 53 and a third 54 friction plate. Optionally, there can be a wave spring 55 mounted behind the pressure plate 50. All of the plates and wave spring are mounted generally concentrically about a central axis of the clutch 40.

Also mounted about the central axis of the clutch 40, and in engagement with the friction plates 51, is a rotating transmission component 56. While a transmission component is illustrated in this embodiment, other types of rotating components that are typically in engagement with a clutch may also be used with the clutch of the present invention. A transmission housing 58 (or other non-rotating component) is engaged with the separator plates 45 and pressure plate 50. The presence of transmission fluid may exist around the separator plates 45, pressure plate 50 and friction plates 51. This may include a conventional transmission fluid (not shown), oil, or other fluid commonly used with clutches to allow for cooling of the components.

When referring to a non-rotating component (member or housing) herein, it is meant to include both components that are truly rotationally stationary, as well as components that rotate, but at a different velocity than the rotating component. Transmissions often include both clutches that engage a rotating component with a truly non-rotating component, and clutches that engage a rotating component with another rotating component that is rotating at a different velocity before engagement of the clutch.

The third separator plate 49 includes a first set of forward extending cantilevered beam springs 60 and a second set of rearward extending cantilevered beam springs. 62. The forward extending springs 60 extend toward the second separator plate 48 and the rearward extending springs 62 extend toward the pressure plate 50. One will note that the forward springs 60 alternate with the rearward springs 62, which will allow the springs to maintain the third separator plate 49 in parallel alignment with the second separator plate 48 and pressure plate 50 as the plates are squeezed together. Also, in this embodiment, the rearward extending springs 62 have a higher spring rate than the forward extending springs 60. The springs 60, 62 are created by forming integral tabs extending from the separator plate 49 and then bending them over to form small cantilevered members, which then act as springs. The springs 60, 62 are located radially outward of the friction plates 53, 54 so as not to interfere with the high speed surface contact between the separator plates/pressure plate and the friction plates.

Of course, while only the third separator plate 49 is illustrated with the springs 60, 62, the first separator plate 47, second separator plate 48 and/or the pressure plate 50 can also include beam springs. The beam springs on the various plates can then be sized and shaped to produce different spring rates. This will allow one designing a clutch assembly flexibility in obtaining the desired sequence and timing of the engagement of the various plates. Also, of course, the number of separator plates (and corresponding friction plates), as well as the number of springs on each particular plate, can vary, as is desired for the particular application.

Figure 6:
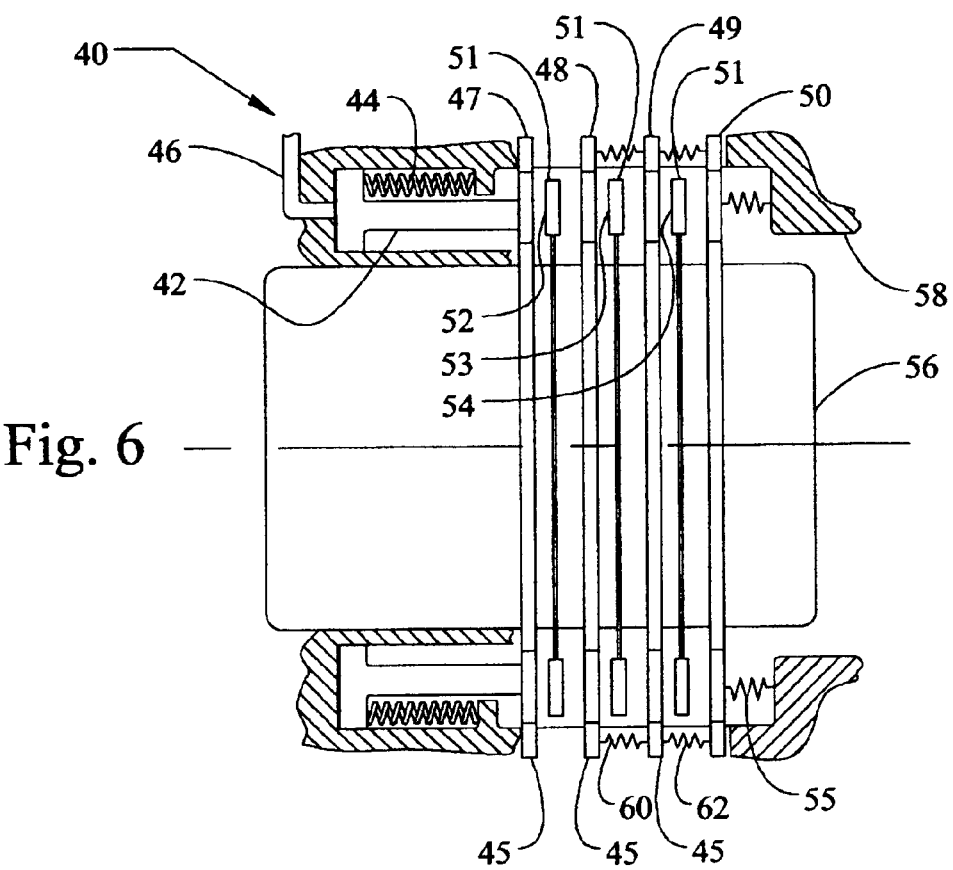
FIG. 6 is a schematic view of the clutch of FIG. 4, illustrated in the open position.

The operation of this clutch assembly 40 will be discussed relative to FIGS. 6–9. In FIG. 6, the pressure in the hydraulic feed port 36 is minimal, so that the return spring 44 will push the piston 42 away from the first separator plate 47, thus allowing for gaps between each of the friction plates 51 and the adjacent pressure plates 45 and pressure plate 50, as the case may be. In this instance, the clutch 40 is in its fully open position, and there is no asperity braking and only a very minimal hydrodynamic braking due to the viscosity of the fluid. Thus, the rotating component 56 is generally free to rotate relative to the transmission housing 58.

Figure 7:
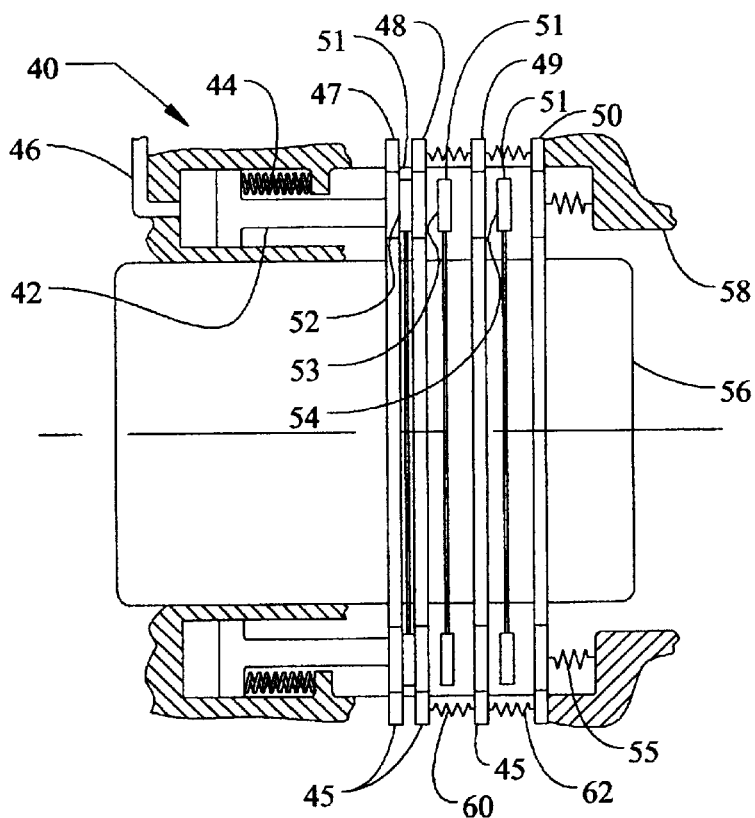
FIG. 7 is a schematic view of the clutch of FIG. 6, illustrated in a mostly open position.

As hydraulic pressure is applied to the piston 42, via the hydraulic feed port 46, the piston 42 presses against the first separator plate 47, causing an increasing force to squeeze the rotating friction plates 51 between their adjacent, non-rotating, separator plates 45 and pressure plate 50, as the case may be. As the squeezing force initially increases due to the piston movement, the first friction plate 52 is compressed between the first separator plate 47 and the second separator plate 48, as is illustrated in FIG. 7. However, due to the beam springs 60, 62, gaps remain, and the second and third friction plates 53, 54 are not initially compressed between adjacent plates.

Figure 8:
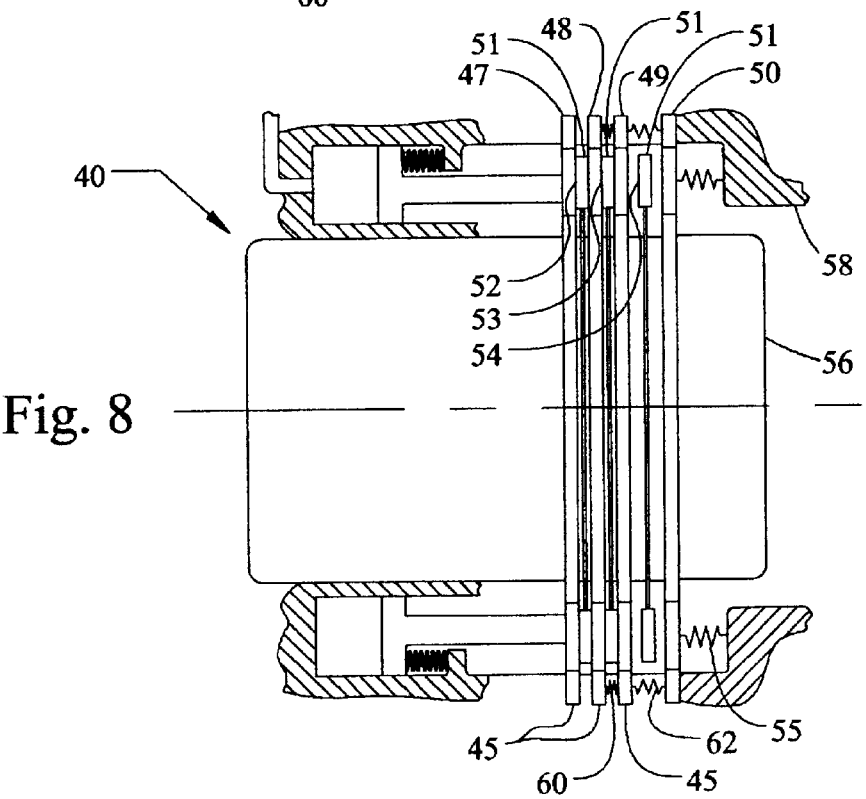
FIG. 8 is a schematic view of the clutch of FIG. 6, illustrated in a mostly closed position.
Figure 10:
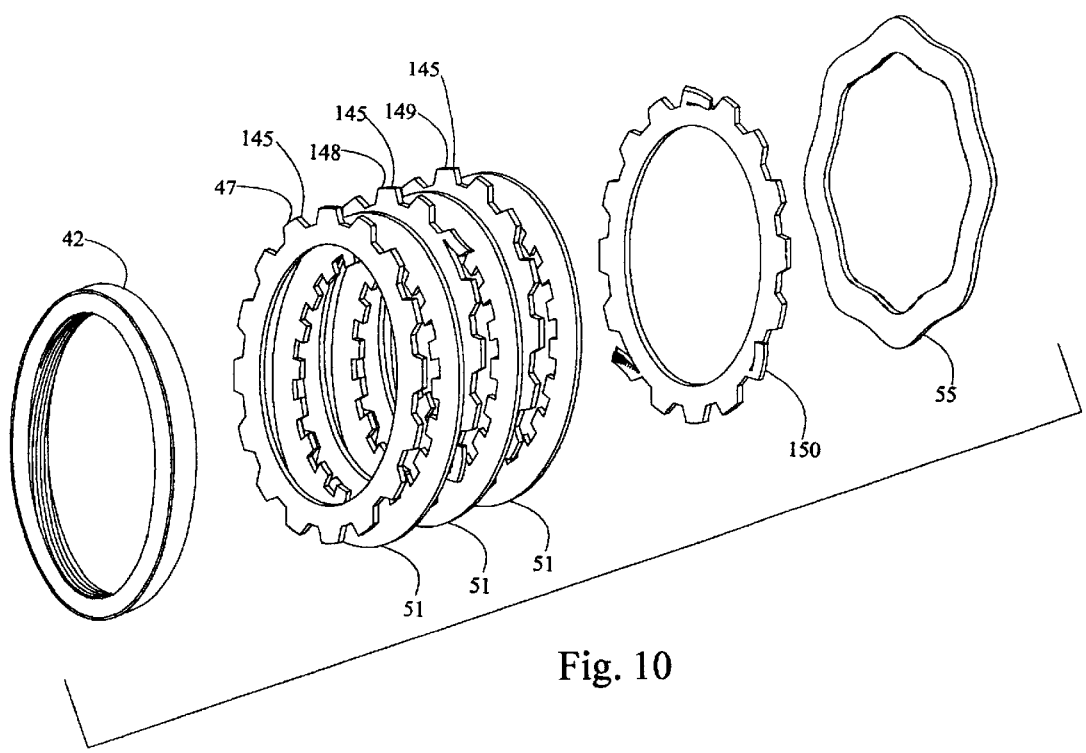
FIG. 10 is an exploded, perspective view of a portion of a clutch, similar to FIG. 4, but illustrating a second embodiment of the present invention.

As the hydraulic pressure is further applied to the piston 42, via the hydraulic feed port 46, the beam springs 60, 62 begin to bend further. Since the forward extending springs 60 have a lower spring rate than the rearward extending springs 62, the second friction plate 53 will be compressed between the second separator plate 48 and the third separator plate 49, while there remains gaps on either side of the third friction plate 54, as is illustrated in FIG. 8.

Finally, as the piston 42 continues its stroke, the rearward extending springs 62 bend, and the third friction plate 54 is compressed between the third separator plate 49 and the pressure plate 50. The piston 42 will continue to stroke until all of the friction plates 51 are fully seated against the corresponding separator plates 45 arid pressure plate 50, as the case may be, and the wave spring 55 is fully compressed. The clutch assembly 40 is now in its fully engaged (closed) position, as is illustrated in FIG. 9.

Also, during the process of closing the clutch assembly 40, the optional wave spring 55 is compressed between the pressure plate 50 and the transmission housing 58, which allows for a longer piston stroke, and resulting softer engagement of the clutch assembly. To speed the engagement, the wave spring 55 can be eliminated.

In this first embodiment, since the friction plates 51 are sequentially engaged, the asperity braking will increase more gradually over the piston stroke. Moreover, since the springs 60, 62 maintain some of the gaps between plates longer, the hydrodynamic braking will also increase more gradually over the piston stroke. In this way, the engagement of the clutch assembly 40 can be made more gradual, without increasing the piston stroke, thereby assuring a minimal time for full engagement of the clutch.

A second embodiment of the present invention is illustrated in FIGS. 10–15. In this embodiment, like elements will be identified with the same element number as the first embodiment, while modified elements will be identified with 100 series element numbers. The piston 42, return spring 44, hydraulic feed port 46, first separator plate 47, friction plates 51, wave spring 55, rotating transmission component 56, and transmission housing 58 are the same in this embodiment of the clutch assembly 140 as with the first embodiment.

In this embodiment, the third separator plate 149 is conventional, with no spring members. The second separator plate 148 now includes a first set of forward extending beam springs 160 and a second set of rearward extending beam springs 162. The first set of springs 160 are located about one half of the periphery of the second separator plate 148, and the second set of springs 162 are located about the other half of the periphery of the second separator plate 148. The pressure plate 150 includes a set of integral, forward extending, cantilevered, beam springs 164, which are all forward extending. Again, the springs 160, 162 and 164 are located radially farther out than the outer radii of the respective adjacent friction plates 51 so that the springs do not interfere with the frictional contact surfaces of the friction plates 51 and the separator plates 145.

The operation of this second embodiment will now be described in relation to FIGS. 10–15. When the clutch assembly 140 is fully open (disengaged) there is a gap between the friction plates 51 and the respective, adjacent separator plates 145 and/or pressure plate 150, as the case may be, as is illustrated in FIG. 12. The rotating component 56 is generally free to rotate relative to the transmission housing 58, with only a the usual, minimal hydrodynamic braking effect due to the viscosity of the fluid filling the clutch.

As hydraulic pressure is applied to the piston 42, via the hydraulic feed port 46, the piston 42 presses against the first separator plate 47, causing an increasing force to squeeze the rotating friction plates 51 between their adjacent, non-rotating, separator plates 145 and pressure plate 150, as the case may be. As the squeezing force initially increases due to the piston movement, the force due to the forward extending beam springs 160 and the rearward extending beam springs 162 cause the second separator plate 148 to tip. Also, the forward extending springs 164 on the pressure plate 150 maintain the gap between the pressure plate and the third separator plate 149. As a result, the upper portion of the first friction plate 52 is compressed between the first separator plate 47 and the second separator plate 148, and the lower portion of the second friction plate 53 is compressed between the second separator plate 148 and the third separator plate 149, while the third friction plate 54 is not compressed between the third separator plate 149 and the pressure plate 150, as is illustrated in FIG. 13. At this point, then, only a small contact zone on the surface of the friction plates 52, 53 is causing asperity braking, while the much of the surfaces of the plates 52, 53, 54 that are not in contact, are held apart with a gap sufficient that the hydrodynamic braking effect is also limited.

Figure 14:
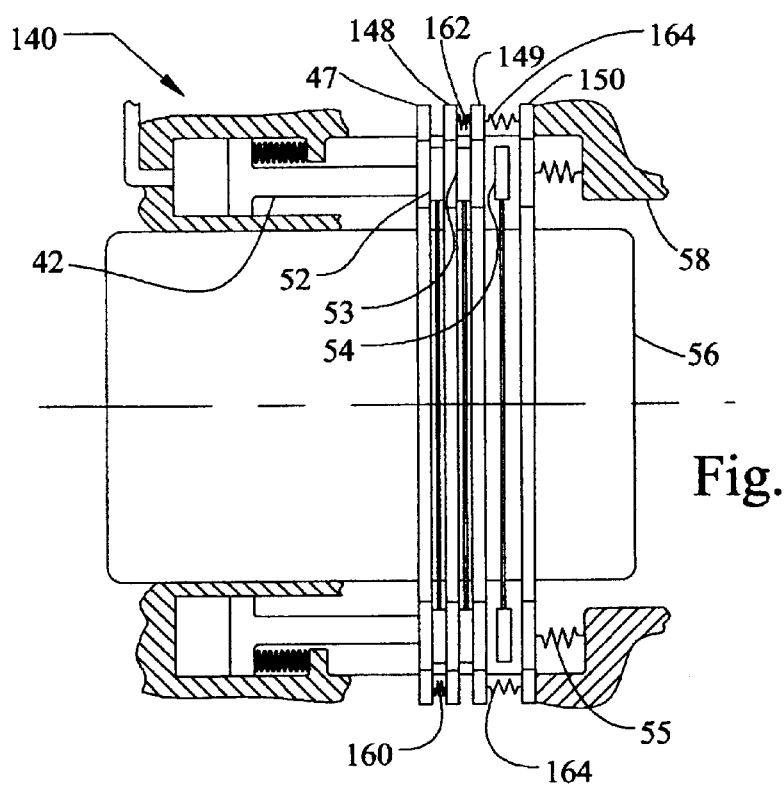
FIG. 14 is a schematic view of the clutch of FIG. 12, illustrated in the mostly closed position.

Now, as the piston 42 further squeezes the stack of clutch plates, the springs 160, 162 deflect and, as a result, the separator plate 148 squares back up. This causes the initially small contact zones to gradually grow into full plate contact, as is illustrated in FIG. 14. The two friction plates 52, 53 now have contact on the full surface and so the asperity and hydrodynamic braking will be in effect as with a conventional clutch.

Figure 15:
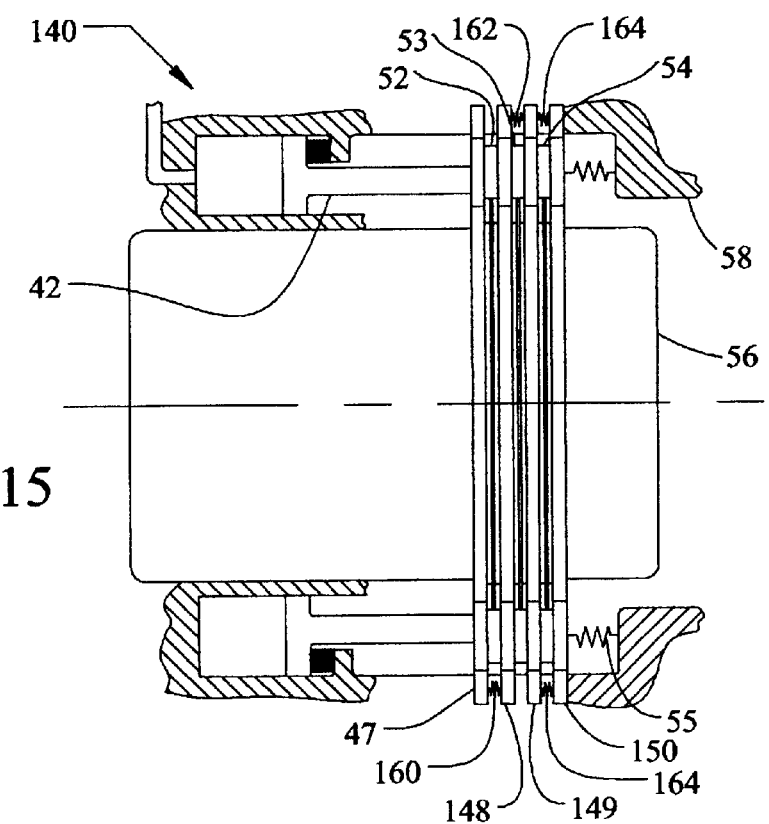
FIG. 15 is a schematic view of the clutch of FIG. 12, illustrated in the closed position.
Figure 16:
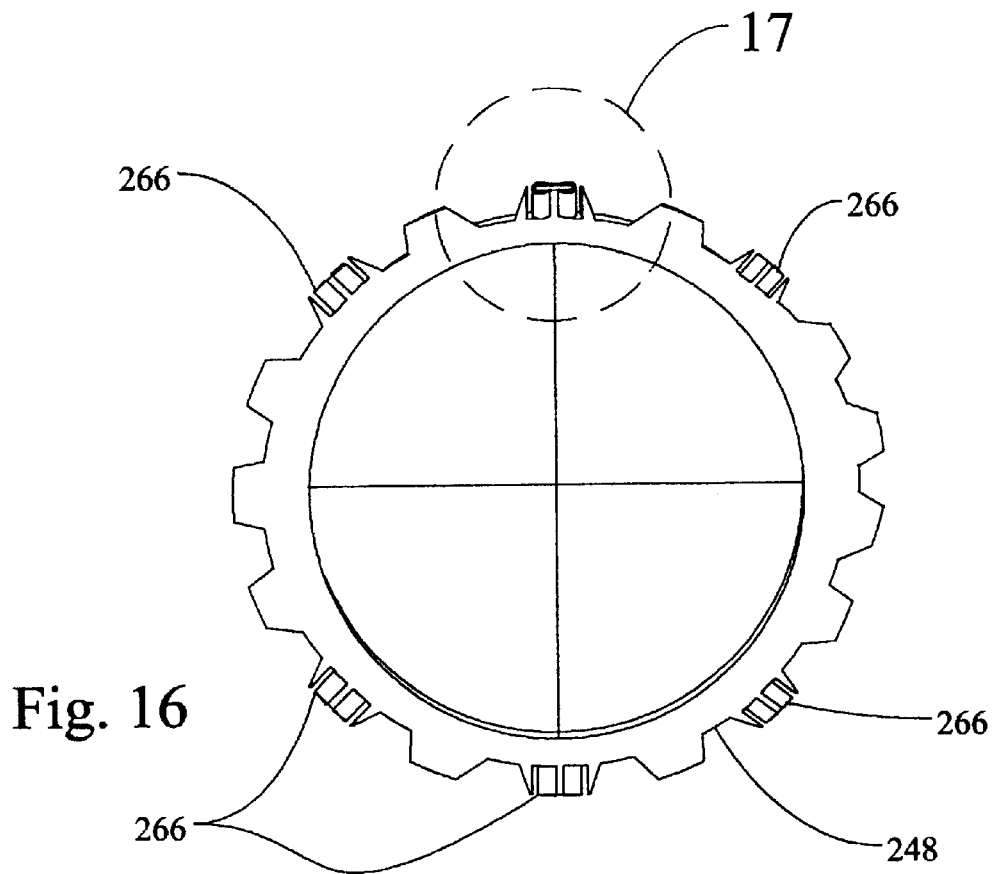
FIG. 16 is an elevation view of a separator plate in accordance with a third embodiment of the present invention.
Figure 17:
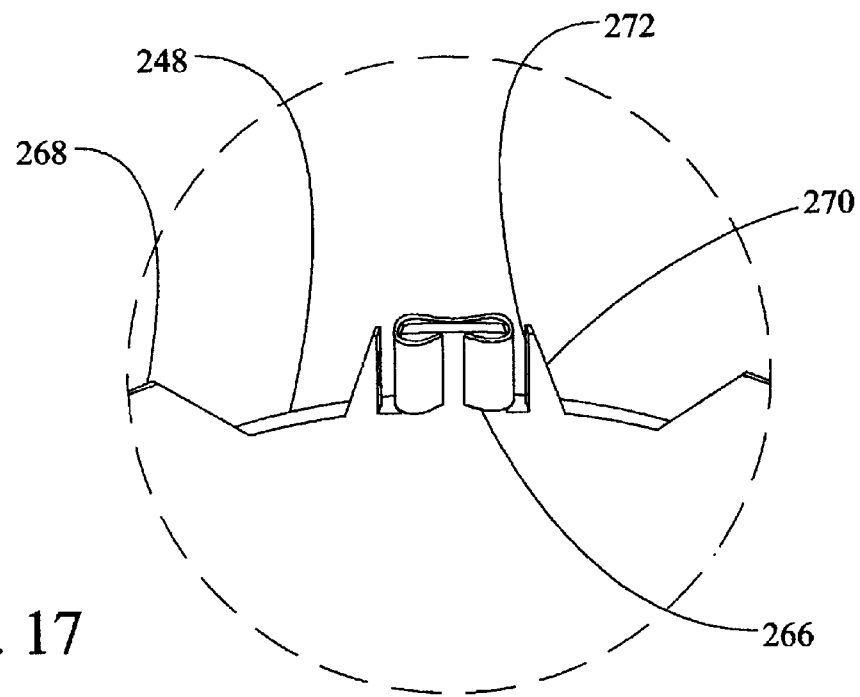
FIG. 17 is a view, on an enlarged scale, of encircled area 17 in FIG. 16.
Figure 18:
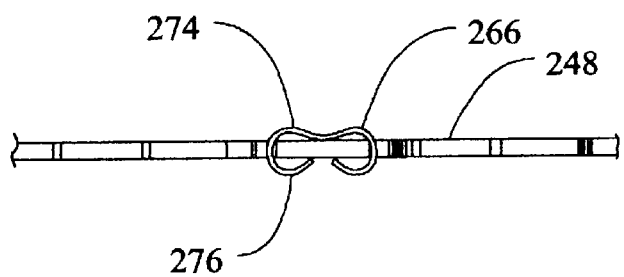
FIG. 18 is a plan view of the portion of the separator plate shown in FIG. 17.
Figure 19:
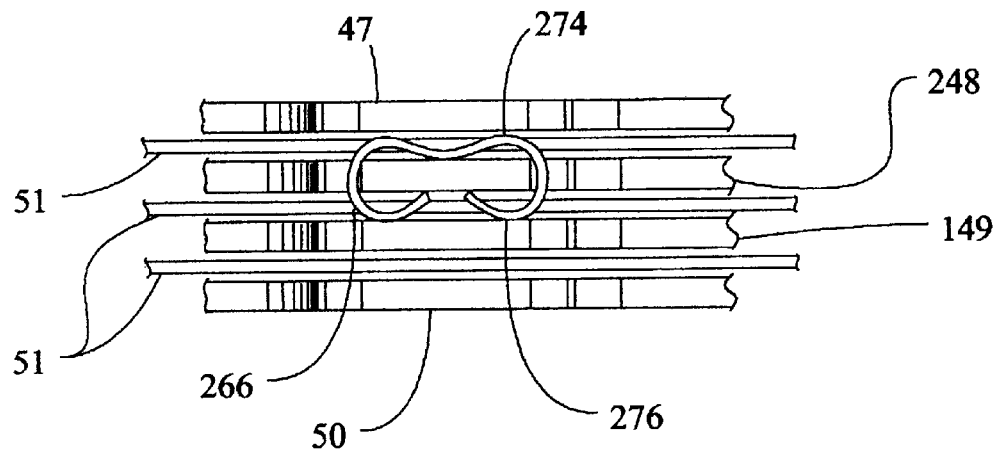
FIG. 19 is a plan view of a portion of a clutch assembly in accordance with the third embodiment of the present invention.

As the piston 42 further squeezes the stack of clutch plates, the third set of springs 164 will deflect, allowing the gaps around the third friction plate 54 to close. This will cause the hydrodynamic and the asperity braking to increase, eventually bringing the clutch into its fully closed (engaged) position, as is illustrated in FIG. 15. This embodiment also illustrates an optional wave spring 55, which deflects as the piston 42 travels through its stroke, further softening the engagement. But, as mentioned above, this may not be necessary to obtain the desired torque curve for the clutch braking engagement. Eliminating the wave spring 55, then, will allow for a shorter overall piston stroke.

The springs mounted on the separator plates and/or the pressure plate in the first two embodiments also provide an additional secondary benefit. When the clutch is in its open position, it assures adequate gaps for the friction plates, which may lower the open clutch drag torque. To further enhance this effect, very soft springs may be added to the separator/pressure plates that are not strong enough to effect the plate sequencing or tipping, but are strong enough to assure the adequate gaps for all of the friction plates, thus minimizing the open clutch drag torque.

In this second embodiment, it is assumed that the overall spring rate on the third set of springs 164 is greater than the overall spring rate on the first set of springs 160 or the second set of springs 162, so that the plate tilting effect will take place first and then the sequential engagement of plates. However, it is contemplated that the spring rates may be reversed so that the sequential engaging of plates may take place first and then the plate tilting effect second, although this may or may not be as desirable depending upon the particular application for the clutch. Also, if, for a particular application, the plate tilting effect is sufficient to allow for a gradual clutch engagement, then the springs 164 on the pressure plate can be eliminated so that there is only the plate tilting effect, but not the sequential engagement of plates. And, of course, there can be various numbers of plates, in which case, there can be multiple plates with springs that cause tipping and/or multiple plates with springs that cause sequential plate engagement.

A third embodiment is illustrated in FIGS. 16–19. In this embodiment, the separator plate 248 includes springs 266, preferably made of a spring quality steel, mounted about its periphery. While six springs are shown, other numbers of springs can be spaced about the periphery. Further, while the springs are only shown on one separator plate, they can be employed on the other separator plates and the pressure plate, as is desired for the particular application. The springs 266 are located radially outward from the friction plates 51 so as not to interfere with the engagement of the friction plates 51 to the separator plates 47, 248, 149 and the pressure plate 50. Each spring 266 is shaped in a generally figure eight pattern and fits in slots 272 in a tab 270 extending radially outward from the separator plate 248. Conveniently, the tabs 270 are located between conventional separator plate tabs 268, which serve the usual function of rotationally engaging the separator plate 248 with the stationary transmission member. Each of the springs 266 can be staked, have a spot weld, adhesives or some other conventional means to securing two parts together in order to assure that each spring 266 stays on its respective tab 270.

The springs 266 each include a first pair of curved portions 274 that extend forward into contact with the first separator plate 47, and a second pair of curved portions 276 that extend rearward into contact with the third separator plate 149. The particular spring rate depends upon the thickness of the spring steel, the length, and the curvature. This allows the spring rates to be tailored to the particular desired closing sequence and rates for the particular clutch.

An advantage to this embodiment is that the springs 266 are made of spring quality steel, which generally allows for a better fatigue life than in the first two embodiments, since separator plates are not typically made of a spring steel. But this embodiment now requires that the separator plates have multiple parts to assemble, whereas the first and second embodiments have one integral part.

The operation of the separator plates and springs is the same as in the first embodiment. If there are springs on some separator plates and not on others, this will cause the sequential engaging of the friction plates. Moreover, one can employ wider springs (or higher spring rate) on some separator plates, and narrower (or lower spring rate) on other separator plates. In this way one can have a multiple sequential engagement of the series of separator plates with the friction plates. By changing the profile of the spring, this changes the spring rate on each side of the plate. This allows for a great flexibility in collapsing the spring on each side of the separator plate to determine exactly how the friction plates will engage the separator plates as the clutch begins to engage.

Figure 20:
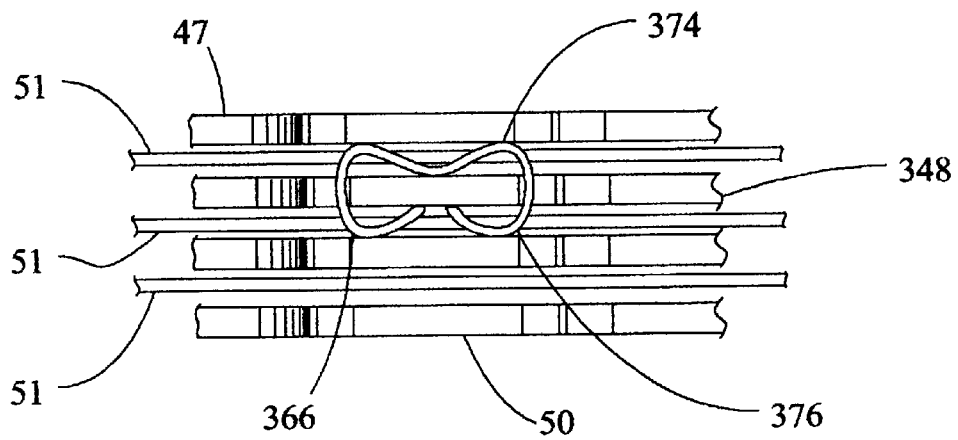
FIG. 20 is a plan view of a portion of a clutch assembly, similar to FIG. 19. but having a different spring in accordance with a fourth embodiment of the present invention.

FIG. 20 illustrates one of the springs 366 of the third embodiment where the first pair of curved portions 374 is formed flatter than the second pair 376. In this way, a lower spring rate develops on the side of the separator plate 348 with the flatter spring portions. The friction plate 51 between the first separator plate 47 and the second separator plate 348 will engage later than the other friction plate 51 adjacent to the second separator plate 348, which will engage later than the friction plate 51 located adjacent to the pressure plate 50. This allows for differing spring rates to be used for sequential plate engagement. Of course, this arrangement also allows for plate tipping, depending upon where and in which orientation the springs are located on the particular separator plate.

Figure 21:
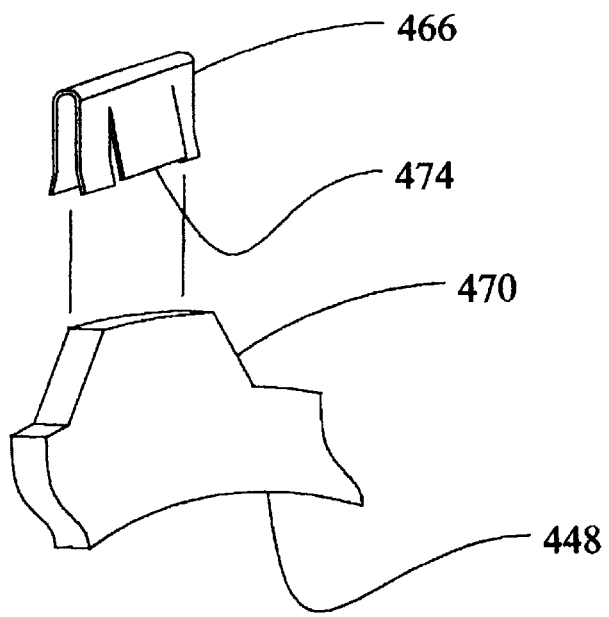
FIG. 21 is an exploded, perspective view of a spring and a portion of a separator plate in accordance with a fifth embodiment of the present invention.

A fourth embodiment is illustrated in FIG. 21. In this embodiment, the springs are formed by clips 466 that snap over a tab 470 the outer periphery of the separator plate 448, with a finger 474 bent out to form a cantilever spring. This spring can be located at various positions on the separator plate 448, with fingers 474 on one or both sides of the separator plate 448, and of different widths, as is desired for the particular application.

Other alternative shapes for the springs on the separator plates are illustrated in FIGS. 22–26 in which different shapes of springs are employed to provide the spring effect between the separator plates. Again, they can be located at various locations, with varying spring rates on either (or both) sides of the particular separator plates as is desired for the particular clutch engagement and timing characteristics.

Figures 22, 23:
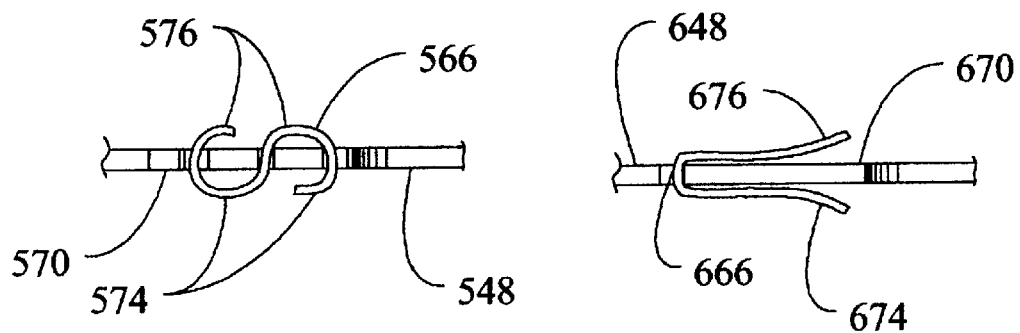
FIG. 22 is a plan view of a spring and a portion of a separator plate in accordance with a sixth embodiment of the present invention.
FIG. 23 is a plan view of a spring and a portion of a separator plate in accordance with a seventh embodiment of the present invention.

FIG. 22 illustrates a sixth embodiment of the present invention where the spring 566 is formed into an S-shape, and is mounted on a tab 570 of a separator plate 548.. It includes a first pair of curved portions 574 and a second pair of curved portions 576, which can be shaped to obtain the desired spring rate.

FIG. 23 illustrates a seventh embodiment of the present invention where the spring 666 is formed into a dual cantilever shape, with a first curved, cantilever beam portion 674 and a second curved, cantilever beam portion 676. It is mounted on a tab 670 of a separator plate 648. The curvature and location of the springs 666 can be varied, as desired, on one or more separator plates.

Figure 24:
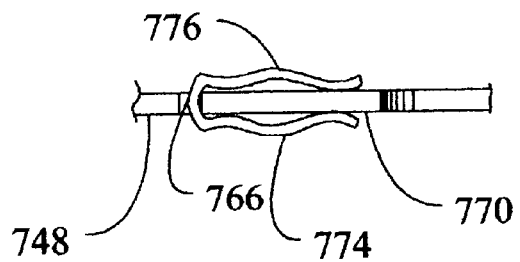
FIG. 24 is a plan view of a spring and a portion of a separator plate in accordance with an eighth embodiment of the present invention.

FIG. 24 illustrates an eighth embodiment of the present invention where the spring 766 is formed into a wave shape, with a first wave spring portion 774 and a second wave spring portion 776. Again, it is mounted on a tab 770 of a separator plate 748.

Figure 25:
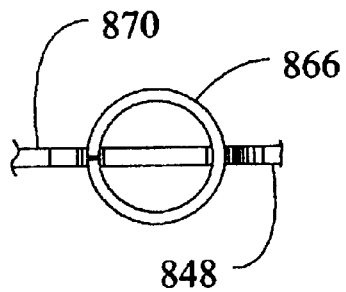
FIG. 25 is a plan view of a spring and a portion of a separator plate in accordance with a ninth embodiment of the present invention.

FIG. 25 illustrates a ninth embodiment of the present invention where the spring 866 is formed into a cylindrical shape and mounted on a tab 870 of a separator plate 848.

Figure 26:
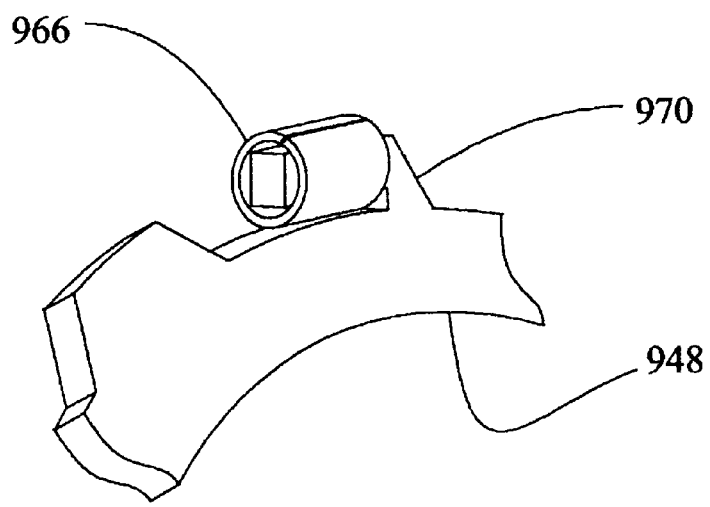
FIG. 26 is a perspective view of a spring and a portion of a separator plate in accordance with a tenth embodiment of the present invention.

FIG. 26 illustrates a tenth embodiment of the present invention where the spring 966 is formed into a cylindrical shape, as in FIG. 25, but mounted transversely on a tab 970 of a separator plate 948. The different shapes of the springs in the alternate embodiments vary in the amount of flexibility in allowing for differing spring rates on different sides of the particular separator plate, and in the forming requirements to manufacture the springs. But the different shapes allow for flexibility in producing the desired clutch engagement, and several of these different embodiments of springs may be employed in the same clutch assembly as is desired for the particular application.

While certain embodiments of the present invention have been described in detail, those familiar with the art to which this invention relates will recognize various alternative designs and embodiments for practicing the invention as defined by the following claims. For example, the friction plates can have springs about their radially inner peripheries, instead of or in addition to springs about the outer peripheries of the separator plates, in order to allow a variety of ways to sequentially engage the plates. Additionally, while generally not as desirable, if the friction plates are fixed to the outer stationary component and the separator plates are fixed to the inner rotating component, then the friction plates could include the springs about their outer peripheries or the separator plates could include springs about their inner peripheries to create the desired sequencing and/or tilting of plates.

What is claimed is:

1. A clutch assembly for controlling the rotation between a rotating member and a non-rotating member comprising:
   a first set of frictional members, including at least two first frictional members;
   a second set of frictional members, including at least three second frictional members interleaved with the first set of frictional members;
   one of the first set and the second set being rotationally fixed to the rotating member, and the other of the first and the second set being rotationally fixed to the non-rotating member;
   a compressor, having a series of positions ranging from an open position allowing for gaps between adjacent members of the first set and the second set of frictional members to a closed position that does not allow for gaps between adjacent members of the first set and the second set of frictional members; and
   the second set of frictional members having at least one spring located at a periphery of at least one of the second frictional members, with the spring extending toward at least one of the other of the second frictional members for biasing the at least one of the second frictional members away from the other of the second frictional members.

2. The clutch assembly of claim 1 wherein the second set of frictional members includes at least one separator plate and at least one pressure plate, with the spring being integrally formed with one of the at least one separator plate and the at least one pressure plate.

3. The clutch assembly of claim 1 wherein the second set of frictional members includes at least one separator plate and at least one pressure plate, with the spring being mounted on one of the at least one separator plate and the at least one pressure plate.

4. The clutch assembly of claim 1 wherein the at least one spring is oriented and shaped to create a larger bias away from the other member of the second set of frictional members about a first portion of the other member than about a second portion of the other member, whereby the at least one member will tip relative to the other member when the compressor is in a position other than the open position and the closed position.

5. The clutch assembly of claim 1 wherein the at least one spring is at least two springs oriented and shaped to cause the one of the second set of friction members to be biased away from the other of the second set of friction members in a generally parallel orientation.

6. The clutch assembly of claim 1 wherein the second set of frictional members further includes at least a second spring located at a periphery of a different one of the second set of friction members than the at least one spring.

7. The clutch assembly of claim 1 wherein the at least one spring is at least two springs oriented and shaped to cause the one of the second set of friction members to be biased away from the other of the second set of friction members in a generally parallel orientation; and wherein the second set of friction members includes at least a third spring located at a periphery of another of the second set of friction members, and is oriented and shaped to create a larger bias away from an adjacent one of the other members of the second set of frictional members about a first portion of the adjacent one of the other members than about a second portion of the adjacent one of the other members, whereby the another member will tip relative to the adjacent one member when the compressor is in a position other than the open position and the closed position.

8. The clutch assembly of claim 1 wherein the periphery of the one member of the second set of frictional members is the radially outer periphery, and the at least one spring is at least a first spring formed from spring steel in a generally figure eight shape and mounted on the outer periphery.

9. The clutch assembly of claim 8 wherein the frictional member includes a first side and a second side and wherein the figure eight shape of the first spring includes a first portion generally extending from the first side and a second portion generally extending from the second side, with the second portion extending a lesser distance from second side than the first portion extends from the first side.

10. The clutch assembly of claim 9 wherein the at least one spring includes a second spring, circumferentially spaced from the first spring, formed in a generally figure eight shape including a first portion generally extending from the second side and a second portion generally extending from the first side, with the second portion of the second spring extending a lesser distance from the first side than the first portion of the second spring extends from the second side.

11. The clutch assembly of claim 1 wherein the periphery of the one member of the second set of frictional members is the radially outer periphery, and the at least one spring includes a generally U-shaped portion mounted on the periphery, and with a cantilevered tab portion extending from the U-shaped portion.

12. The clutch assembly of claim 1 wherein the periphery of the one member of the second set of frictional members is the radially outer periphery, the one member includes a first side and a second side, and the at least one spring includes a pair of wave shaped portions, with one of the pair on the first side and the second of the pair on the second side.

13. A clutch assembly for controlling the rotation between a rotating member and a non-rotating member comprising:
   a first set of frictional plates, including at least two friction plates;
   a second set of frictional plates, including at least two separator plates and a pressure plate interleaved with the first set of frictional plates;
   one of the first set and the second set being rotationally fixed to the rotating member, and the other of the first and the second set being rotationally fixed to the non-rotating member;
   a piston, having a series of positions ranging from an open position allowing for gaps between adjacent plates of the first set and the second set of frictional plates to a closed position that does not allow for gaps between adjacent plates of the first set and the second set of frictional plates; and
   the second set of frictional plates having at least one spring located at a periphery of at least one of the separator plates and the pressure plate, with the spring extending toward at least one of the other of the separator plates and the pressure plate for biasing the at least one of the plates away from the at least one of the other of the plates.

14. The clutch assembly of claim 13 wherein the first set of frictional plates includes at least three friction plates and the second set of frictional plates includes at least three separator plates and a pressure plate, and wherein the at least one spring includes a first set of springs, each having generally the same spring force, mounted about the periphery of one of the separator plates and the pressure plate for biasing the one of the separator plates and the pressure plate away from the at least one of the other plates in a generally parallel orientation.

15. The clutch assembly of claim 14 wherein the second set of frictional plates includes a second set of springs mounted about the periphery of a different one of the separator plates and the pressure plate than the first set of springs, and with the second set of springs including at least one spring having a spring force that is different from another circumferentially spaced spring in the second set.

16. The clutch assembly of claim 15 wherein the first set of springs and the second set of springs are made of spring steel and are mounted on some of the outer peripheries of the separator plates and the pressure plate.

17. A method for controlling the rotation between a rotating member and a non-rotating member in a clutch assembly, the clutch assembly having a first set of frictional members rotationally coupled to the rotating member and a second set of frictional members interleaved with the first set and rotationally coupled to the non-rotating member, the method comprising the steps of;
   applying an initial pressure to one of the first set of frictional members and the second set of frictional members to squeeze the first set of frictional members and second set of frictional members toward each other;
   spring biasing at least one member of the first set of frictional members away from an adjacent one of the members of the second set of frictional members;
   applying a second pressure greater than the initial pressure to squeeze the first set of frictional members into contact with the second set of frictional members, for the members that are not spring biased away from one another;
   applying a third pressure greater than the second pressure to squeeze the members in the second set of members that are spring biased away from one another into contact with the first set of frictional members mounted therebetween;
   spring biasing a portion of another member of the second set of frictional members away from a portion of another adjacent one of the members of the second set of frictional members; and applying an intermediate pressure, greater than the initial pressure but less than the third pressure, to squeeze a different portion of the another member into contact with a different portion of the another adjacent member.

18. The method of claim 17 wherein the step of spring biasing includes locating a plurality of springs about a periphery of one of the second set of frictional members.

19. The method of claim 18 wherein the step of spring biasing includes mounting a plurality of generally figure eight shaped springs about the periphery of one of the second set of frictional members.

* * * * *